United States Patent [19]

Rutges et al.

[11] 4,425,421
[45] Jan. 10, 1984

[54] PROCESS FOR THE PRODUCTION OF A LAMINAR ARTICLE AND SUCH ARTICLE CONTAINING INFORMATION IN A HYDROPHILIC COLLOID STRATUM

[75] Inventors: Antonius A. Rutges, Boechout; Ludovicus M. Mertens, Halle; Maurits W. Van Grasdorff, Berchem, all of Belgium

[73] Assignee: AGFA-GEVAERT N.V., Mortsel, Belgium

[21] Appl. No.: 421,419

[22] Filed: Sep. 22, 1982

[30] Foreign Application Priority Data

Oct. 9, 1981 [GB] United Kingdom ............... 8130557

[51] Int. Cl.³ ..................... G03C 5/54; G03C 1/40; G03C 1/48
[52] U.S. Cl. ..................................... 430/238; 430/10; 430/213; 430/231; 430/232; 430/236; 430/237; 430/248; 430/247; 430/540; 430/941; 430/952
[58] Field of Search ............... 430/202, 213, 231, 232, 430/237, 248, 10, 540, 941, 952, 238, 236, 325, 247

[56] References Cited

U.S. PATENT DOCUMENTS

| | | | |
|---|---|---|---|
| 3,236,644 | 2/1966 | Gilman et al. | 430/232 |
| 3,244,519 | 4/1966 | Schwerin | 430/540 |
| 3,345,164 | 10/1967 | Cohen et al. | 430/232 |
| 3,642,474 | 2/1972 | Verelst et al. | 430/301 |
| 4,101,701 | 7/1978 | Gordon | 430/10 |
| 4,287,290 | 9/1981 | Mizuno et al. | 430/204 |

Primary Examiner—Richard L. Schilling
Attorney, Agent, or Firm—William J. Daniel

[57] ABSTRACT

A process for the production of a sealed laminate especially a security document comprising a support sheet, an image layer containing a photographic image present in a hardened hydrophilic diffusion transfer reversal image-receiving colloid medium made from an image receiving layer containing photosensitive iron(III) compound, and a protective cover sheet is described wherein:

(1) the support sheet is of a polymeric heat meltable material,
(2) the image layer is disposed adherently on the support sheet to cover the support area only partly and to leave uncovered at least one edge area thereof,
(3) the protective sheet is of a heat-meltable material which in the melted state is capable of forming a homogeneous mass with melted support sheet material, and
(4) the protective cover sheet is heat sealed to the support sheet in the uncovered areas thereof to form the homogeneous mass, whereby said image layer is sealed between the support sheet and the protective sheet.

14 Claims, 2 Drawing Figures

PROCESS FOR THE PRODUCTION OF A LAMINAR ARTICLE AND SUCH ARTICLE CONTAINING INFORMATION IN A HYDROPHILIC COLLOID STRATUM

This invention relates to a process for the production of a sealed laminate comprising a support sheet, an image layer containing a photographic image present in a hydrophilic colloid medium and a protective sheet, and to sealed laminates, e.g. an identification document, thereby obtained.

The production of laminar articles comprising a photograph is well known. For example, identification documents contain a black-and-white or colour photograph sandwiched between a clear plastic protective cover sheet and a rear support sheet. The assembly is laminated together to provide a durable identification document also called I.D. card. In view of the widespread use of I.D. cards as a security document, e.g. to establish a person's authorization to conduct certain activities (e.g. driver's licence) or to have access to certain areas or to engage in commercial actions, it is important that forgery of the I.D. card by alteration of certain of its data and/or photograph is made impossible. To prevent direct contact with the information the use of a pouch has been proposed to envelop the information carrier e.g. photograph.

Such is typically done by providing front and back members sealed along a portion of the periphery, e.g. on three sides, and having an unsealed portion of the periphery adapted for introduction of the photograph or other document, whereupon the open portion is sealed. Such a pouch can be relatively easily opened by severing the sealed peripheral portion so that e.g. the photograph can be removed, subjected to forgery and re-inserted into the same or another pouch without detection of the opening or removal of the seal. The protective pouch material is normally water-impermeable and hydrophobic so that direct adherence thereof e.g. by a heat-treatment, to a hydrophilic colloid layer of a photograph, formed e.g. by silver halide photography poses a serious problem.

In the U.S. Pat. No. 3,582,439 laminated structures are described which comprise a colour photograph bonded to a sheet of vinyl through an ethylene vinyl acetate copolymer intermediate coat, and identification cards including the same. The resulting identification card may be in the form of a sheet of vinyl laminated to the surface of the colour print, or it may be in the form of a vinyl pouch having a colour print contained therein with at least the image-bearing surface securely laminated to the inner surface of one wall of the pouch. Preferably, the pouch is constructed to be of slightly greater dimensions than the colour print so that it can be sealed around its periphery, as by heat-sealing, to completely enclose the print.

According to the French Pat. No. 71.09565, more particularly in FIG. 2, photosensitive layers and magnetizable layers do not cover the whole area of the support, whereby the material forming the protection sheet on heating and laminating fills the free space area between the photosensitive and magnetizable layer and adheres directly in these areas and at the borders to the support. There is, however, no indication how these photosensitive layers and magnetizable layers are applied locally.

Local application of image stratums proceeds according to published European Patent Application (EP-A) No. 00 18 887 by screen-printing. According to this EP-A an identification card is provided with is characterized by a support (20) locally coated by screen-printing with photosensitive diazo stratums (21, 22) containing a first thermo-adhesive resin, and a transparent protective film (23, 24) containing a second thermo-adhesive resin which is fixed to the card under the action of pressure and heat after the image has been formed in the photosensitive layer.

Screen-printing is, however, prohibitive when only a small quantity of sheets bearing a particular imaging area is required. As it is only economical to use screen-printing if a large quantity of sheets is produced, it is only feasible for a dealer to stock those sheets which are most often required. If, however, a user asks for a special arrangement i.e. a small area at a specific location such image area will be have to be produced in another and more economic way.

Such an economic approach may be realized by a process derived from the process described in the U.S. Pat. No. 3,642,474.

According to the process a coloured image or pattern is produced on a permanent support from an unhardened coloured hydrophilic colloid layer containing a photosensitive iron(III) complex which yields iron(II) ions on exposure to active electromagnetic radiation, exposing the colloid layer to image-wise modulated active electromagnetic radiation, treating the exposed layer with an aqueous liquid comprising hydrogen peroxide so as to effect hardening of the exposed regions of the colloid layer, and removing the non-exposed regions of such layer from the support by washing with an aqueous liquid.

It has now been found that this process of photohardening and wash-off development is particularly suited for forming selected portions of an originally overall applied image layer which is an image-receiving layer for use in the silver complex or dye diffusion transfer reversal (DTR) process.

It is an object of the present invention to create locally on a support hydrophilic colloid containing image receiving layer by removing a hydrophobic meltable support from corresponding regions of such layer.

It is a further object to provide a laminate including such image-receiving layer regions carrying photographic information e.g. for identification purposes.

It is more particularly an object of the present invention to eliminate the use of the aforementioned pouch which leaves open the way of forging of the identification document, and not to rely for the sealing on overall applied heat-activatable adhesive layers, which differ in structure and chemical composition from the basic material of the support and cover sheet, and consequently can be attacked the area of the seal by the action of certain chemicals, solvents and/or water vapour.

Other objects and advantages of the present invention will become clear from the further description.

SUMMARY OF THE INVENTION

The present invention provides a process for the production of a sealed laminated structure comprising a support sheet, an image layer containing a photographic image present in a hydrophilic colloid binder and a protective sheet, characterized by the steps comprising:

(1) disposing adherently on a polymeric meltable support material an image layer constituted by an image receiving layer containing development nuclei acting as a catalyst for development of silver complexes to silver or a mordant suited for the mordanting of dyes applied in a dye diffusion transfer imaging process, and the layer containing also a photosensitive iron(III) complex by means of which iron(II) ions are produced on exposure to actinic radiation, and a hydrophilic colloid that undergoes a reduction in water-solubility on oxidization of the iron(II) ions with hydrogen peroxide, (2) pattern-wise photo-exposing the hydrophilic colloid binder layer e.g. using an original having one or more opaque areas, e.g. opaque edge area extending along the periphery of the layer, (3) treating the exposed hydrophilic colloid binder layer with an aqueous peroxide solution reducing thereby the water-solubility of the binder in the exposed areas, (5) removing the unexposed, unhardened and still water-soluble portions of the hydrophilic colloid binder layer by washing with an aqueous medium leaving on the support at least one region of said hydrophilic colloid binder layer corresponding with the exposed areas, (6) forming a silver or dye diffusion transfer image in the remaining binder layer regions either immediately after step (2) or immediately after step (5), (7) providing a protective sheet formed of a heat meltable polymeric material which in the melted state is capable of forming a homogeneous mass with melted support sheet material, and (8) heat-sealing the protective sheet to the support sheet in the areas of the support free of binder layer to form in said areas a homogeneous mass, whereby the binder layer regions containing the images are sealed therebetween, preventing peeling apart of the said support sheet and protective sheet material.

DETAILED DESCRIPTION OF THE INVENTION

In a modified embodiment of the process of the present invention, either or both of the support sheet and protective sheet have a laminated structure wherein a layer of polymeric heat meltable material is applied to a material non-melting in the heat-sealing step e.g. a paper sheet or a metal sheet such as an aluminium sheet.

According to a preferred embodiment said protective sheet material and support sheet material consist essentially of chemically the same material, preferably a meltable hydrophobic polymeric substance. E.g. both the protective sheet material and support sheet can substantially consist of a meltable hydrophobic vinyl chloride homopolymer or copolymer wherein the majority of the repeating units are vinyl chloride units so that on melting a homogeneous mechanically and chemically non-separatable composition is obtained.

According to another embodiment the protective sheet material and support sheet material are polyester materials. The support may be at least partly coated with a heat meltable subbing layer formed of material which in the melted state is capable of forming a homogeneous mass with the sheets with which it is associated, e.g. the subbing layer is formed of chemically the same kind of material as the support and protective sheet with which it is associated. E.g. the subbing layer is a hydrophobic polymeric subbing layer.

The sealed laminated article obtained by the process according to the present invention may be an identification document incorporating a photographic black-and-white or colour image in an image layer containing the hydrophilic colloid binder adheringly applied to the support consisting of or including a meltable polymeric sheet or layer, such image layer partly covering the support in such a way that at least an edge area, preferably extending along the periphery of the support, i.e. the entire edge area around the periphery of the support sheet, is free of the image layer, and the thus uncovered support in the area is bonded by heat- and pressure-sealing to a protective cover sheet, the cover sheet and support being formed, respectively, of polymeric material which upon melting flow into a homogeneous polymeric mass mixture, preventing upon solidification peeling apart of the support from the cover sheet.

According to a preferred embodiment the support sheet is also sealed to the protective sheet at one or more of its areas other than the edge portions thereof.

Although heat-activatable adhesive layers such as described e.g. in the pouch structure of U.S. Pat. No. 4,101,701 are not strictly necessary for the laminates of the present invention, the laminates of the present invention may, however, include the embodiment wherein the image layer, i.e. containing hydrophilic colloid, adheres also to the protective sheet by a heat-activatable adhesive stratum covering the protective sheet in a substantially same area as the hydrophilic colloid binder layer covers the support of the laminate. According to the preferred embodiment the heat-activatable adhesive reacts chemically with hydrophilic colloid binder of the image layer. A laminate of that structure will resist completely all attempts of separation at the laminated sheets. Suitable reactive adhesives for hydrophilic colloids which contain reactive hydrogen atoms in free hydroxyl and/or amino groups as e.g. in gelatin, contain polyisocyanate precursors as described e.g. in U.S. Pat. No. 3,216,846 in admixture with at least one containing free hydroxyl groups e.g. partially hydrolyzed copoly(vinyl chloride/vinyl acetate) described e.g. in the U.S. Pat. No. 3,366,505. Such precursors react to create urethane and/or ureido cross-links between the hydrophilic colloid binder and the resin of the reactive adhesive composition.

The support and protective sheet are preferably made of polyvinyl chloride but other relatively low melting (melting point ≦180° C.) polymeric materials such as polyethylene or polyethylene coated paper may be used likewise. According to another embodiment a high melting (melting point ≧200° C.) support covered with a strongly adhering low melting (melting point <150° C.) polymer layer may serve as a support for the present laminated article. Polymers having a melting point above 200° C. are e.g. polyethylene terephthalate (260° C.), cellulose triacetate (306° C.), polyacrylonitrile (317° C.), polychlorotrifluoroethylene (218° C.) and polytetrafluoroethylene (327° C.). Polymers having a melting point below 180° C. are e.g. polyethylene (137° C.), polyisobutylene (128° C.), trans-1,4-polyisoprene (74° C.), polychloroprene (80° C.), polypropylene (176° C.), copolymers of vinylidene chloride and vinyl acetate, copolymers of vinylidene chloride and vinyl chloride, and copolymers of vinyl chloride and vinyl acetate. The lower softening point and higher solubility of the latter copolymers make fabrication very much easier and allow easier lamination.

Commercial compositions contain 5–40% by weight of vinyl acetate. Flexibility and other properties, e.g. lowering of the melting point, are influenced by the use of plasticizers for which reference is made e.g. to "Textbook of Polymer Chemistry" by Fred W. Billmeyer, Jr., Interscience Publishers, Inc., New York (1957) p.313–314. Further the polyvinyl chloride homo- or copolymer supports and protective sheets may contain stabilizing agents against deterioration and yellowing as described e.g. in "The Chemistry of Organic Film Formers" by D. H. Solomon, John Wiley & Sons, Inc., New York (1967) p.175–177 and by Kirk-Othmer Encyclopedia of Chemical Technology, 2nd compl. revised edition, Vol. 21 (1965) p. 390.

The support material may contain pigments or dyes to give it a white opaque or coloured aspect e.g. contains titanium dioxide particles applied in the melt before extrusion. A hydrophobic support can be given improved adherence to the hydrophilic colloid layer by special subbing layers. Such subbing layers are well known to those skilled in the art. Examples of subbing compositions especially useful for polyethylene terephthalate and vinyl chloride polymers and copolymers are described in U.S. Pat. No. 3,712,812 and in UK patent specification No. 1,234,755. As described in U.S. Pat. No. 3,712,812 a corona-discharge surface treatment increases the adhesion of hydrophilic colloid layers to hydrophobic supports. The subbing layer, if any is used, may be applied only in the areas wherein the image layer containing hydrophilic colloid is to be applied. For that purpose a gravure coating technique is particularly useful.

The process of the present invention includes the embodiment wherein the image layer is applied to the support sheet after an image has been obtained therein by a silver complex or dye diffusion transfer step. The application proceeds e.g. by transfer (decalcomania) from a temporary support, in order to obtain an image-containing layer on the polymeric meltable support material serving as a permanent support before sealing is effected. Preferably, however, the image layer is obtained by overall applying a layer of the hydrophilic colloid containing composition to the permanent support and forming a photographic image therein after the formation of the image layer region by the already described wash-off step (5).

It was unexpected that, after the photohardening of the hydrophilic colloid image layer, by way of the hydroxyl radical polymerisation initiators formed by reaction of iron(II) ions with hydrogen peroxide, the development nuclei could still be reached sufficiently by the silver complexes to allow their catalyzed development to silver. Likewise the hardening did not block dye diffusion so that the mordanting agent used in a dye diffusion transfer process still could be reached by the dyes and fixed thereby.

The development nuclei used in a hydrophilic colloid binder in a silver complex diffusion transfer reversal (DTR) image-receiving material are of the kind generally known in the art, e.g. those described in the book: "Photographic silver halide diffusion processes" by André Rott and Edith Weyde—The Focal Press; London and New York (1972) 54–56. Particularly suited are colloidal silver and the sulphides e.g. of silver and nickel and mixed sulphides thereof. The DTR-image-receiving layer may include in the hydrophilic colloid binder any other additive known for use in such materials, e.g. toning agents, a certain amount of silver halide solvent, developing agents, thickening agents e.g. carboxymethylcellulose, opacifying agents e.g. pigments, polymer latex particles e.g. polyethyl acrylate, gelatin hardening agents, optical brightening agents, surface active agents and agents improving adherence to the support e.g. colloidal silica particles as described e.g. in the UK patent application No. 81 151 70.

In the embodiment wherein the image layer functions as an image-receiving element for image-wise transferred dye images formed with acid (anionic) dyes, the dye-receiving stratum can be composed of, or contain, basic polymeric mordants such as polymers of aminoguanidine derivatives of vinyl methyl ketone such as described in U.S. Pat. No. 2,882,156 of Louis M. Minsk, issued Apr. 14, 1959, and basic polymeric mordants and derivatives, e.g. poly-4-vinylpyridine, the 2-vinylpyridine polymer metho-p-toluene sulphonate and similar compounds described in U.S. Pat. No. 2,484,430 of Robert H. Sprague and Leslie G. Brooker, issued Oct. 11, 1949, the compounds described in the published German Patent Application No. 2,200,063 filed Jan. 11, 1971 by Agfa-Gevaert A. G. Suitable mordanting binders include, e.g. guanylhydrazone derivatives of acyl styrene polymers, as described, e.g., in published German Patent Specification No. 2,009,498, filed Feb. 28, 1970 by Agfa-Gevaert A. G. In general, however, other binders, e.g. gelatin, would be added to the last-mentioned mordanting binders. Effective mordanting compositions are long-chain quaternary ammonium or phosphonium compounds or ternary sulphonium compounds, e.g. those described in U.S. Pat. Nos. 3,271,147 of Walter M. Bush and 3,271,148 of Keith E. Whitmore, both issued Sept. 6, 1966, and cetyltrimethyl-ammonium bromide. Certain metal salts and their hydroxides that form sparingly soluble compounds with the acid dyes may be used too.

Examples of dye diffusion imaging systems operating with silver halide emulsion materials and dye image-receiving layers either in two-sheet or monosheet arrangement are described e.g. by L. J. Fleckenstein in the book "The Theory of the Photographic Process" 4th. ed., Macmillan Publishing Co., Inc. New York (1977) p. 366–372 and in the U.S. Pat. No. 4,139,379 and published European Patent Application No. 0 004 399.

In the preparation of the silver image-receiving layer compositions and dye mordanting image-receiving layers for forming the image layer, preferably a proteinaceous hydrophilic colloid, more particularly gelatin is used as binding agent but other natural and synthetic hydrophilic water-permeable organic colloid binding agents may be used alone or in addition thereto. Such binding agents include water-pemeable polyvinyl alcohol and its derivatives, e.g. partially hydrolyzed polyvinyl acetates, polyvinyl ethers, and acetals, and possibly hydrophilic cellulose ethers and esters, alginic acid and poly-N-vinylpyrrolidinone.

The photosensitive iron(III) compounds used in the present image layer are as described in the already mentioned U.S. Pat. No. 3,642,474 preferably of the type wherein the iron(III) ion is complexed by means of ligands having an electron-donating character in respect of the iron(III) ion. Such iron(III) complexes are preferably derived from a polybasic acid that forms complexes of the formula $(Fe^y A_n^z)^x$ wherein: y represents the valency of iron (in the present case 3), z represents the valency of the organic acid and x represents that of the resulting complex ion. According to P. Glafkidès in Photographic Chemistry, Vol. I—Fountain Press London (1958), p.422, the relation x=z·n−y must apply, n being the number of molecules of acid.

Iron(III) complexes that are used more preferably according to the present invention are oxalates, tartrates and citrates.

The sensitivity of the hydrophilic colloid image layer increases with rising concentrations of photosensitive compound. The incorporatable amount of the light-sensitive iron(III) complex is limited by the concentration at which crystallization of that compound in the hydrophilic colloid layer starts. Consequently, it is preferably best to use water-soluble complexes or mixtures of these complexes that do not easily crystallize. Preferred in this respect is ammonium iron(III) oxalate. The image layer may contain up to 40% by weight of ammonium iron(III) oxalate without crystallization in the colloid. Preferably the image layer contains 10 to 25% by weight of the iron(III) complex calculated on the weight of the dry hydrophilic colloid e.g. gelatin.

In principle it is not necessary to use light-sensitive iron(III) complexes, since a number of transition metals of variable valency form complex polybasic acid salts in the same way as iron does (see the above-cited P. Glafkidès reference p. 423). The metal ions in these complexes have to lose a valency by the action of light. Metals which in this respect resemble iron e.g. cobalt, chromium and manganese. The most light-sensitive complex salts are the oxalates followed by the tartrates. The citrates are the most stable of them. The light-sensitivity of the iron(III) complexes is in the wavelength range of 360–450 nm. By the action of light the iron(III) ion in the complex compound loses a valency and becomes an iron(II) ion no longer masked in a complex structure.

After the exposure the iron(II) ions are oxidized with a suitable oxidizing agent from which upon reduction the necessary hardening agent is formed for insolubilizing the hydrophilic colloid of the image layer.

Preferable hardenable hydrophilic colloids are hydrophilic water-soluble colloids containing active hydrogen atoms as are present e.g. in hydroxyl groups and carbonamide groups. Both qualitative characterization and quantitative determination of active hydrogen can be carried out by the procedure known as the Zerewitinoff active hydrogen determination. Hardenable hydrophilic colloids containing active hydrogen atoms are e.g. polyvinyl alcohol, polyacrylamide or gelatin, and other film or stratum-forming proteinaceous colloids.

Optimum hardening for wash-off purposes are obtained with hydrophilic water-soluble colloids that possess the property of "sol-gel transformation" such as gelatin, which offers an easy transfer and good adherence to the permanent support. "Sol-gel transformation" is explained by R. J. Croome and F. G. Clegg in Photographic Gelatin—The Focal Press—London (1965) p. 37–39.

The above hydrophilic colloids may be used in admixture with silver ion complexing agents e.g. as described in the U.S. Pat. No. 2,857,276, screening dyes for improving image-sharpness, optical brightening agents for image contrast enhancement and/or with latent hardening agents, e.g. as described in the UK patent specification No. 962,483, preferably MANUCOLESTER (registered trade mark), an alkali-activatable latent hardening agent) mentioned in that U.K. patent specification. Further may be admixed monomers that can be polymerized catalytically. Suitable monomers of that type are described in the U.S. Pat. Nos. 3,101,270 and 3,136,638, wherein the polymerization of unsaturated organic compounds by means of radiation-sensitive iron compounds as photoinitiators and the production of a photosensitive stencil and a process for making same are disclosed.

Any monomer containing the group $CH_2=C<$, compatible with the selected hydrophilic colloid, preferably gelatin, may be used. A catalytically polymerizable monomeric compound suitable for use in combination with gelatin is acrylamide, which is soluble in water and compatible, i.e. homogeneously miscible, with gelatin (see e.g. K. I. Jacobson and R. E. Jacobson—"Imaging Systems", The Focal Press, London—New York (1978) p. 190).

In admixture with the hardenable hydrophilic colloid optionally mixed with such catalytically polymerizable compound, a cross-linking agent can be used to increase the efficiency of the hardening. For that purpose an unsaturated compound containing at least two terminal vinyl groups each linked to a carbon atom in an unbranched chain or in a ring can be used. A preferred cross-linking agent is N,N-methylene-bis-acrylamide.

Any of the known organic or inorganic peroxides or hydroperoxides may be used to induce the hardening of gelatin and the polymerization of the vinyl monomers. In that connection are mentioned e.g. hydrogen peroxide, ammonium persulphate, methyl hydroperoxide, ethyl hydroperoxide and/or cumene hydroperoxide, the latter being incorporatable in the imaging layer in dispersed state.

Further information about a large number of monomers, cross-linking agents, iron(III) salts and per-compounds which can be used in the production of a colloid pattern by catalytical polymerization upon information-wise irradiation with electromagnetic radiation in the sensitivity spectrum of a photosensitive iron(III) complex compound is given in the already mentioned U.S. Pat. No. 3,101,270.

The exposure of step (3) of the present process is preferably a vacuum frame contact-exposure and is carried out with a light source having sufficiently high emissivity in the ultraviolet range of the spectrum, e.g. a carbon arc, a xenon arc, or a high pressure mercury vapour tube.

The oxidation of the iron(III) ions is preferably carried out with an aqueous solution of an oxidizing agent or composition producing such agent in situ, e.g. an aqueous solution containing hydrogen peroxide or a mixture of citric acid and sodium perborate. The oxidative treatment is preferably carried out at room temperature and normally lasts no longer than 1 minute. A suitable concentration of hydrogen peroxide is 1 to 5%, and the mixture of sodium perborate and critic acid yielding hydrogen peroxide in situ contains preferably 3% by weight of each of these compounds.

It is assumed that during the oxidizing treatment with a per-compound, preferably hydrogen peroxide, the following reaction takes place:

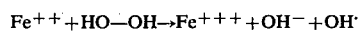

$$Fe^{++} + HO-OH \rightarrow Fe^{+++} + OH^- + OH^·$$

The hydroxyl radicals (OH·) insolubilize the gelatin and other colloids having active hydrogen atoms and catalyze polymerization of vinyl monomers.

The non-hardened gelatin portions are preferably washed off without mechanical rubbing by means of running water at a temperature preferably between 30° and 40° C. The image layer regions which have absorbed an amount of water are then dehydrated preferably (unswelled) in a dehydrating liquid e.g. an alcoholic liquid containing 70 to 30% by volume of water and 30 to 70% by volume of ethanol. Excess of liquid is removed by squeezing the supported imaging layer between two smooth soft rollers e.g. rubber rollers.

For direct continuous tone reproduction in the image layer acting as diffusion transfer reversal image receiving layer, the silver halide emulsions made for such receiving layers may be used. For that purpose silver halide emulsions with a gamma-value lower than 2 and preferably of about 1 are used. Continuous tone reproduction with the silver complex diffusion transfer reversal (DTR) proceeds preferably with special silver halide emulsion layer materials that have been manufactured as described in the U.S. Pat. Nos. 3,985,561 and 4,242,436.

Preferably for DTR-processing in the present invention silver halide emulsion layers are used in which the silver halide comprises a mixture of silver chloride and at least one of silver bromide and silver iodide, wherein at least 90 mole % based on the total molar weight of the silver halide is silver chloride, and the ratio by weight of hydrophilic colloid to silver halide expressed as equivalent silver nitrate is between about 3:1 and about 10:1.

These silver halide emulsion layers are normally panchromatically sensitized by spectral sensitizing agents known in the art e.g. trimethine cyanines containing a di-substituted benzoselenazole nucleus substituted e.g. with methyl and/or methoxy groups, the other heterocyclic nucleus being one of the type known in the structure of cyanine dyes. The spectral sensitizing range may be extended therewith to 690 nm. In order to improve the total photosensitivity of the silver halide mainly containing chloride before spectral sensitization, iodide ions e.g. derived from potassium iodide may be added to the already formed silver halide emulsions.

According to a preferred embodiment illustrated in the accompanying FIGS. 1 and 2, the laminated article in the form of an I.D. card is sealed not only around the periphery of the support but also in a region located more centrally so that the severing of the peripheral area still will not allow one to open the document and obtain access to the information.

DETAILED DESCRIPTION OF THE DRAWINGS

Figure 1:
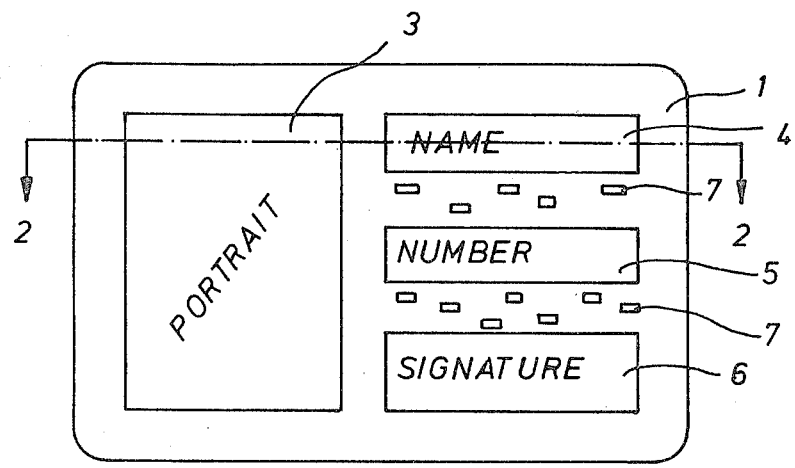
FIG. 1 represents a front view of the laminated article of this invention.
Figure 2:
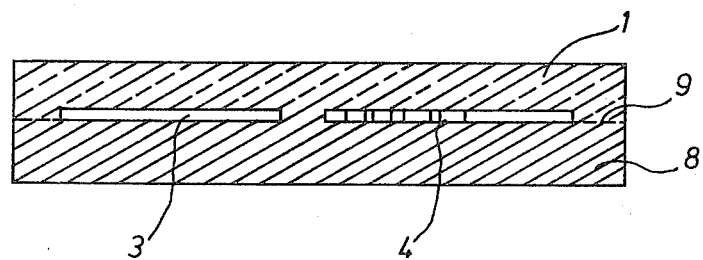
FIG. 2 is a cross-sectional view of that article on the line 2—2 of FIG. 1.

Element 1 is a transparent polymeric protective sheet e.g. made of polyvinyl chloride. The protective sheet 1 is heat- and pressure-sealed to an opaque hydrophobic support 9, which is e.g. a polyvinyl chloride sheet containing white titanium dioxide particles. Support 8 after corona discharge treatment is coated with a gelatin binder layer in areas, 3, 4, 5 and 6 which binder for improving its adherence to the hydrophobic support contains e.g. colloidal silica, the ratio by weight of gelatin to silica being preferably within the range of 5/1 to 1/2. The binder layer contains also development nuclei acting as catalyst for physical development of silver complexes used in the silver complex diffusion transfer reversal (DTR) process. In regions 3, 4, 5 and 6 DTR-silver images are present representing a continuous tone black-and-white portrait of the card owner, his name, identification number and signature respectively. The regions 3, 4, 5 and 6 are embedded in the uniformly fused polymer mass of the protective sheet 1 and support 8 by heat- and pressure-sealing. The laminated article can further, as shown in FIG. 1, contain a pattern of holes 7 for electronic identification. The initial separation face between sheet 1 and support 8 has been indicated by the dash line 9.

The support sheet and the protective sheet have a thickness normally in the range of 0.075 mm to 1 mm. According to a particular procedure several thin sheets are stacked to reach a thickness sufficient to form a rigid or semi-rigid card on heat and pressure sealing. The thickness of the image layer is the thickness required for common silver halide emulsion layers and DTR-image- or dye-receiving layers, e.g. in the order of 0.1 to 10 μm.

The lamination by heat and pressure sealing may proceed e.g. between flat steel plates under a pressure of 5 to 10 kg/sq.cm at a temperature below the melting point of the polymers involved but preferably above their glass transition temperature which e.g. for polyvinyl chloride is 87° C. and for polystyrene 100° C., so e.g. in a temperature range of 80° C. to 150° C. The temperature is limited by the decomposition temperature of the hydrophilic colloid, e.g. gelatin, used in the layer containing the image information.

The I.D. card may contain apart from visual information e.g. a portrait, signature, visual numerical code etc., other identifying matter e.g. in the form of magnetizable, fluorescent or ultraviolet or infrared-absorbing matter which is not detectable visually. Such matter is preferably applied prior to sealing and protected by the seal. Identifying matter may be supplied e.g. likewise in the form of protruding dots applied in a coded pattern, which can be recognized by known devices. The rear of the support may contain information, e.g. in the form of embossed material e.g. numbers or letters in relief.

Other specific information which may be included in the present article is e.g. in the form of a dye spot having a specific absorption spectrum recognizable by an electronic photocell detection apparatus. The laminated article obtained according to the present invention may include all kinds of compounds playing a role in the stability of photographic image information, e.g. ultraviolet absorbers and anti-oxidants. Due to the high moisture-resistance of the seal obtained according to the present invention no degradative effects resulting e.g. from hydrolysis and bacterial influences have to be feared.

In a preferred system for forming an I.D. card a diffusion transfer reversal process is applied to form photographically a portrait and descriptive information simultaneously on one and the same support carrying more than one hydrophilic colloid image-receiving layer regions. A camera suited for the process is described in U.S. Pat. No. 4,011,570. This camera operates with a photosensitive silver halide emulsion material used in conjunction with a separatable image-receiving material whereon through the silver complex diffusion transfer reversal process, portrait and descriptive matter images are formed as positive silver images simultaneously.

If a photographic image, e.g. portrait and printed graphic indicia e.g. letters and numbers, have to accept information applied with ink on the same support different surface characteristics may be required. Whereas for the hydrophilic colloid-containing image layer the surface is preferably smooth (having a Bekk-value larger than 200 s), a certain surface roughness e.g. smaller than 10 s Bekk-value is favourable for printing with hydrophobic inks or toners as are used e.g. in lithographic, letterpress, gravure printing and electrophotography. The Bekk-value is a measure for surface roughness and is determined according to TAPPI STANDARD T 479 sm-48.

It is difficult to provide on one and the same polymeric heat-meltable surface a rough area for printing and a smooth area for the image layer. From a manufacturing standpoint it is also difficult to obtain a polymeric heat-sealable sheet having on one side a rough surface for printing and at the other side a smooth surface for providing the image layer thereon.

According to one embodiment of the process of the present invention, any ink-printed information may be applied to the roughed inner surface of the meltable protective transparent sheet in the form of a reversed image (mirror image). As an alternative or in addition thereto ink-printed information can be disposed on a separate meltable sheet element which preferably is a printed hydrophobic meltable polymer sheet.

Thus, the process of the present invention includes any embodiment wherein one or more meltable sheets carrying ink- or toner-printed information are heat-sealed together with the image-carrying support sheet and protective sheet.

For example, a separate printed sheet, which may be printed on both sides, is arranged e.g. between the present supported photographic image layer and protective sheet and/or serves as an additional support which can be heat-sealed to the rear of the present photographic image-carrying support. In the latter case, when carrying printed information on both sides an extra meltable support is used to protect the outwardly disposed printed information. Instead of using a double-side printed sheet two such sheets may be used that are arranged with their non-printed sides in contiguous contact. Dependent on the arrangement of the sheet(s) containing printed matter and the image-carrying sheet in the assembly the sheets are transparent or opaque provided that visual inspection remains possible.

The present laminated article may include a watermark which can be obtained by silver complex diffusion transfer processing on a locally applied layer region containing a concentration of development nuclei such that the ultimate maximum optical density achievable therewith is below 0.8 or by printing the watermark information on a translucent meltable polymer sheet e.g. white pigmented polyvinyl chloride sheet which with the printed watermark side is arranged in contact with the support carrying the image-receiving layer. The whole assembly is integrally joined by heat and pressure sealing with protective clear polymer sheets e.g. polyvinyl chloride sheets arranged at the front and rear side of the article.

According to a special embodiment the present article is applied as a part of a passport booklet, wherein the identification information is united to the inner side of the folded cover of the booklet.

There are several possible ways to obtain such an arrangement. In a passport booklet normally the inner side of the cover and the front side of the first leaf are glued together. The different leaves of the booklet are centrally attached in the fold by staples introduced from the back and hence not removable once the first leaf is attached to the inner side of the cover. Attachment of the present laminated article inside such a passport booklet may proceed according to a first arrangement by securing the support of the present article provided with a hot melt adhesive layer to one cover innerside with the first leaf sandwiched in between. According to another arrangement the first leaf is replaced in entirety by the present laminated article having a support with outer hot melt adhesive layer to permit its direct attachment to the whole inner side of the cover of the booklet. In this manner identification information is provided at both the front and rear inner sides of the folded cover.

The invention is illustrated in more detail in the following examples, without however limiting it thereto.

The percentages and ratios are by weight.

Example 1

In the preparation of an image-receiving material a paper support coated at both sides with a polyethylene layer having a coverage of at least 15 g per sq.m, after corona charging is coated with the following image-receiving layer composition:

| | |
|---|---|
| carboxymethylcellulose | 12 g |
| gelatin | 45 g |
| colloidal nickel sulphide nuclei (applied from an aqueous dispersion containing 2% of gelatin and 0.6% of NiS) | 7 g |
| iron (III) ammonium oxalate | 13.5 g |
| polyethyl acrylate (applied as latex) | 0.75 g (solids) |
| MANUCOLESTER (registered trademark) being a 1.5% solution of alginic acid propylene glycol ester having a degree of esterification of 67% of the carboxyl groups and serving as hardening agent in alkaline medium. | 1.5 g |
| water up to | 1000 g |

The coating proceeded at a coverage of 1 l for 18 sq.m.

After drying, coated layer was exposed through a mask to form image areas as seen in FIG. 1.

The exposure proceeded for 80 s with ultraviolet radiation in a DUPLIPHOT HS (registered trade name of the Applicant) contact U.V.-exposure apparatus operating with a mercury vapour lamp of 1000 W.

The exposed material was wash-off developed with a water-spray in the GEVAPROOF (registered trade name of the Applicant) type 400 wash-off apparatus.

After drying, the resultant image regions were ready for receiving a silver image produced by the silver complex diffusion transfer process.

As alternatives instead of a polyethylene coated paper support, supports based on polyvinyl chloride or polypropylene were used.

The lamination of the imaged layer regions between their support and a clear protective sheet i.e. polyethylene sheet, polyvinyl chloride sheet or polypropylene sheet respectively, proceeded by heat- and pressure-sealing between flat steel plates under a pressure of 5 to 10 kg/sq.cm or in a roll-type laminator (e.g. a pouch-laminator) with roll-pressures of 0.25-7 kg/cm at a temperature below the melting point of the polymers involved but above their glass transition temperature i.e. in a temperature range of 80° C. to 150° C.

Example 2

Example 1 was repeated with the difference, however, that the coating composition contained additionally:

poly-N-vinylpyrrolidinone    10 g

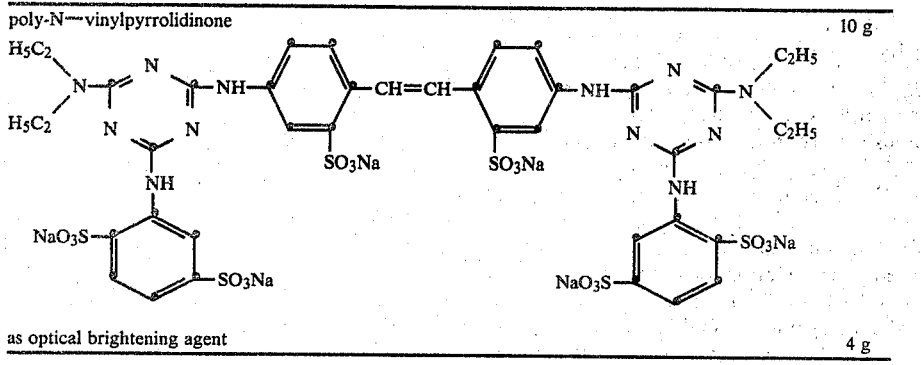

as optical brightening agent    4 g

By the presence of the poly-N-vinylpyrrolidinone serving as mordanting agent for anionic dyes the obtained image-receiving layer stratums are suited for use in a dye diffusion transfer system as described e.g. in the published European Patent Application No. 0 004 399.

Example 3

Example 1 was repeated with the difference, however, that the coating composition contained additionally a yellow screening dye soluble in an alkaline aqueous liquid, viz. 2 g of

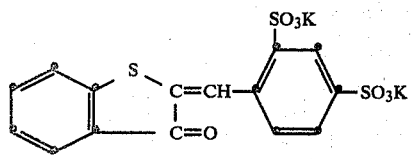

The use of the screening dye improved the dot sharpness of the screen dots obtained in a screen-wise exposure of the image-receiving layer which after wash-off treatment formed as image stratum in the form of a dot screen pattern suited for silver complex diffusion transfer processing.

Example 4

Example 1 was repeated with the difference, however, that the image-receiving layer was coated from the following composition:

| | |
|---|---|
| gelatin | 45 g |
| succinimide (silver ion-complexing agent) | 12 g |
| colloidal nickel sulphide nuclei (applied from an aqueous dispersion containing 2% of gelatin and 0.6% of NiS) | 7 g |
| iron (III) ammonium oxalate | 13.5 g |
| polyethyl acrylate (applied as latex) | 0.75 g (solids) |
| MANUCOLESTER (registered trademark) | 1.5 g |
| water up to | 1000 ml |

Example 5

Example 4 was repeated but to the coating composition of the image receiving layer 2 of the yellow screening dye of Example 3 were added. Before its wash-off treatment and silver complex diffusion transfer reversal processing the image-receiving layer was exposed with ultraviolet radiation through a contact screen.

We claim:

1. Process for the production of a sealed laminate comprising a support layer of a heat-meltable material, an image layer containing a photographic image present in a hydrophilic colloid binder and a protective sheet, characterized by the steps comprising:
   (1) disposing adherently on a polymeric meltable support layer an image layer for receiving an image and containing development nuclei acting as a catalyst for development of silver complexes to silver or a mordant suited for the mordanting of dyes applied in a dye diffusion transfer imaging process, said image layer containing also a photosensitive iron(III) compound capable of forming iron(II) ions on exposure to actinic radiation, and a hydrophilic colloid that undergoes a reduction in water-solubility on oxidization of said iron(II) ions with hydrogen peroxide,
   (2) pattern-wise photo-exposing said hydrophilic colloid binder layer,
   (3) treating the exposed hydrophilic colloid binder layer with an aqueous peroxide solution to reduce thereby the water-solubility of said binder in the exposed areas,
   (5) removing the unexposed, unhardened and still water-soluble areas of said hydrophilic colloid binder layer by wash-off to leave on the support image layer regions corresponding with the exposed areas,
   (6) forming a silver or dye diffusion transfer image in the remaining image layer regions either immediately after step (2) or immediately after step (5),
   (7) providing a protective sheet formed of a heat-meltable polymeric material which in the melted state is capable of fusing into a homogeneous mass with melted support layer material, and
   (8) heat-sealing said protective sheet to said support layer in the areas of the support free of said image layer to form in said areas a homogeneous mass, whereby said image layer is sealed between said support layer and said protective sheet and peeling apart of said support layer and protective sheet material is prevented.

2. A process according to claim 1, wherein said support layer is a heat meltable hydrophobic vinyl chloride homopolymer or copolymer.

3. A process according to claim 1, wherein said support layer is a heat-meltable polyester.

4. A process according to claim 1, wherein said support layer is at least partly coated with a heat-meltable subbing layer formed of material which in the melted state is capable of fusing into a homogeneous mass with the support layer material.

5. A process according to claim 4, wherein said subbing layer is formed of chemically the same kind of material as the support layer.

6. A process according to claim 1, wherein said subbing layer is a hydrophobic polymeric subbing layer.

7. A process according to claim 1, wherein said support layer and said protective sheet consist essentially of chemically the same material.

8. A process according to claim 1, wherein the whole of the edge area around the periphery of said support layer is free of said image to permit fusion of said layer and sheet in the peripheral edges thereof.

9. A process according to claim 1, wherein the support layer is also sealed to the protective sheet at one or more areas separate from the edge portions thereof.

10. A process according to claim 1, wherein the image layer is sealed to the protective sheet by a heat-activatable adhesive applied over substantially the entire area of said image layer.

11. A process according to claim 1, wherein at least one of the support layers and protective sheet has laminate structure and includes a layer of a polymeric heat meltable material applied to a layer of a material non melting in the heat-sealing step.

12. A process according to claim 1, wherein one or more meltable sheets carrying ink- or toner-printed information are sandwiched between said image-layer and said protective sheet.

13. A process according to claim 1, wherein for the formation of a silver image in said image receiving layer a silver halide emulsion material is used whose silver halide is a mixture of silver chloride and at least one of silver bromide and silver iodide wherein at least 90 mole % based on the total molar weight of the silver halide is silver chloride, and the ratio by weight of hydrophilic colloid to silver halide expressed as equivalent silver nitrate is between about 3:1 and about 10:1.

14. Process for the production of a sealed laminar article comprising a support sheet, an image layer containing a photographic image contained in a hydrophilic colloid binder and a protective sheet, characterized in that said process comprises the steps of (1) Removably disposing on a temporary support material an image layer which is an image receiving layer containing development nuclei acting as a catalyst for development of silver complexes to silver or as a mordant suited for the mordanting of dyes applied in a dye diffusion transfer imaging process, and said layer containing also a photosensitive iron (III) compound, by means of which iron (II) ions are produced on exposure to actinic radiation, and a hydrophilic colloid binder that undergoes a reduction in water-solubility on oxidizing said iron (II) ions with hydrogen peroxide, (2) pattern-wise photo-exposing said hydrophilic colloid binder layer, (3) treating the exposed hydrophilic colloid binder layer with an aqueous peroxide solution reducing thereby the water-solubility of said binder in the exposed areas, (4) removing the unexposed, unhardened and still water-soluble portions of said hydrophilic colloid binder layer by wash-off leaving on the support (an) image layer stratum(s) of said hydrophilic colloid binder layer corresponding with the exposed areas, (5) forming a silver or dye diffusion transfer image in said image layer stratum(s) either immediately after step (2) or immediately after step (4), (6) transferring said image layer stratum containing the silver or dye diffusion image therein onto a permanent polymeric meltable support material, (7) providing over said transferred stratum a protective sheet formed of a heat-meltable polymeric material which in the melted state is capable of forming a homogeneous mass with melted support sheet material, and (8) heat-sealing said protective sheet to said support sheet in the areas of the support free of said image layer to form in said areas a homogeneous mass, whereby said image layer is sealed between said support sheet and said protective sheet preventing thereby peeling apart of said support sheet and protective sheet material.

* * * * *

UNITED STATES PATENT AND TRADEMARK OFFICE
CERTIFICATE OF CORRECTION

PATENT NO. : 4,425,421

DATED : January 10, 1984

INVENTOR(S) : Antonius A. Rutges et al

It is certified that error appears in the above-identified patent and that said Letters Patent is hereby corrected as shown below:

The title should read -- PROCESS FOR THE PRODUCTION OF LAMINATES AND LAMINATES CONTAINING INFORMATION IN A HYDROPHILIC COLLOID STRATUM --.

In the Claims:

Claim 1, column 14, line 31, -- binder -- should be inserted after "colloid";

line 40, "(5)" should be -- (4) --;

line 45, "(6)" should be -- (5) --;

line 48, "(7)" should be -- (6) --;

line 52, "(8)" should be -- (7) --.

Signed and Sealed this

Twentieth Day of March 1984

[SEAL]

Attest:

GERALD J. MOSSINGHOFF

Attesting Officer

Commissioner of Patents and Trademarks